United States Patent
Chou et al.

(10) Patent No.: US 7,586,822 B2
(45) Date of Patent: Sep. 8, 2009

(54) OPTICAL DRIVE CONTROLLER PROVIDING CALIBRATED LASER DIODE DRIVER

(75) Inventors: Chia-Hua Chou, Hsin Tien (TW); Chih-Cheng Chen, Hsin-Chu (TW)

(73) Assignee: MediaTek Inc., Hsin-Chu Hsien (TW)

( * ) Notice: Subject to any disclaimer, the term of this patent is extended or adjusted under 35 U.S.C. 154(b) by 450 days.

(21) Appl. No.: 10/623,264

(22) Filed: Jul. 18, 2003

(65) Prior Publication Data

US 2005/0013233 A1  Jan. 20, 2005

(51) Int. Cl.
    *G11B 7/00* (2006.01)
(52) U.S. Cl. ................... 369/53.44; 369/53.26
(58) Field of Classification Search ........... None
    See application file for complete search history.

(56) References Cited

U.S. PATENT DOCUMENTS

| | | | |
|---|---|---|---|
| 5,060,208 A * | 10/1991 | Nagai et al. ............... 369/13.27 |
| 5,606,468 A * | 2/1997 | Kodama ..................... 360/75 |
| 5,675,600 A | 10/1997 | Yamamoto et al. |
| 5,805,559 A * | 9/1998 | Murakami et al. .......... 369/47.5 |
| 6,930,968 B2 * | 8/2005 | Kamioka et al. .......... 369/59.16 |
| 6,944,109 B2 * | 9/2005 | Wang et al. ............... 369/53.26 |
| 6,975,578 B2 * | 12/2005 | Endoh et al. .............. 369/275.4 |
| 7,113,434 B2 | 9/2006 | Akasaki |
| 2001/0002864 A1 | 6/2001 | Nomura |
| 2001/0038586 A1 * | 11/2001 | Gushima et al. .......... 369/47.35 |
| 2001/0043534 A1 | 11/2001 | Gyo |
| 2004/0125836 A1 * | 7/2004 | Lai et al. .................. 372/33 |

\* cited by examiner

*Primary Examiner*—Joseph Feild
*Assistant Examiner*—Joseph Haley
(74) *Attorney, Agent, or Firm*—Winston Hsu

(57) ABSTRACT

An optical disk drive includes an optical disk drive controller that can test the write channels between the controller and the laser diode driver. Using the results of this testing, the optical disk drive controller adjusts the characteristics of the write channel signals provided to the laser diode driver to correct for one or more detected imperfections in the write channel signals. Both the optical disk drive controller and the laser diode driver have communications ports to facilitate communication. The optical disk drive controller programs the operating characteristics of the laser diode driver so that the laser diode driver can be optimized for the measured characteristics of the write channels.

13 Claims, 4 Drawing Sheets

FIG. 3(a) RCLK
FIG. 3(b) OSCEN
FIG. 3(c) WCLK1
FIG. 3(d) WCLK2
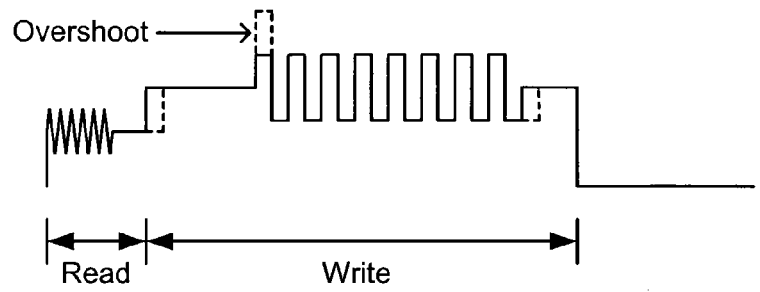
FIG. 3(e) LDOUT
FIG. 4(a) RCLK
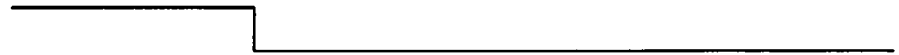
FIG. 4(b) OSCEN
FIG. 4(c) WCLK1
FIG. 4(d) WCLK2
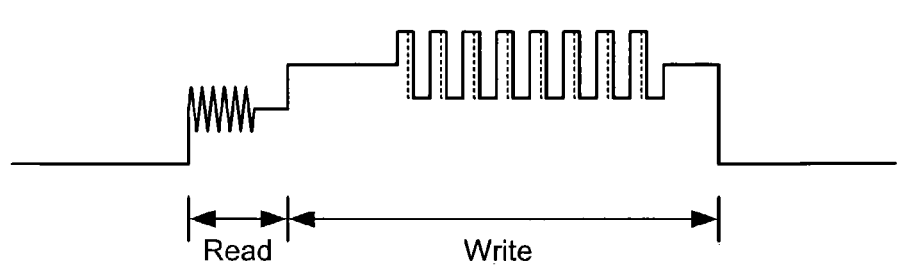
FIG. 4(e) LDOUT

OPTICAL DRIVE CONTROLLER PROVIDING CALIBRATED LASER DIODE DRIVER

BACKGROUND

1. Field of the Invention

The present invention relates to recordable optical memories such as optical disk drives and more particularly to optimizing the signals involved in writing to the optical memory.

2. Description of the Related Art

Optical disk drives capable of writing data to an optical disk use a laser diode driver to generate the signals used to drive and modulate the laser diode typically used to write to the optical disk. This is in part due to the fact that laser diodes require relatively high current and specially conditioned signals to operate without damaging the laser diode. In many disk systems, the laser diode and the laser diode driver are mounted together on the optical head of the disk drive, so that the entire assembly is movable with respect to the surface of the optical disk. This arrangement simplifies the optics of the system, allowing fixed optics to be used for focusing light on the disk and collecting light from the disk. To limit the weight, and thus the inertial lag of the optical head, convention optical disk drives limit the electronics mounted on the optical head to those needed for performance. It is consequently conventional to provide a controller remote from the optical head and the laser diode driver that performs processing and generates the signals supplied to the circuitry of the laser diode driver.

In the typical case the optical disk drive controller is one integrated circuit or chip mounted at some distance from the laser diode driver circuitry, which is provided on a second chip. The optical disk drive controller is mounted on a printed circuit board, with other drive electronics, with the printed circuit board rigidly mounted with respect to the frame of the optical disk drive. The laser diode driver is also a chip and typically is mounted on a small printed circuit board with the laser diode on the optical head. A flexible cable connects the controller's printed circuit board to the driver's printed circuit board. This flexible cable carries the signals from the controller that determine how and with what signals the laser diode driver drives the laser diode.

There are some instances when feedback is provided from the laser diode to the optical disk controller. For example, the operating characteristics of laser diodes such as gain and wavelength are sensitive to variations in the temperature of the laser diode around its nominal operating temperature. Some optical disk drives measure the laser diode temperature and provide a measure of the temperature to the optical disk controller, which adjusts the drive signal to accommodate the changed operating characteristics associated with that temperature.

Other optical disk drives may monitor the output power of a laser diode, for example by sampling the output of the laser diode using a monitor diode. The optical disk drive adjusts the drive current to the laser diode to adjust the output level of the laser diode or to accommodate different storage media. Such optical disk drives are not, however, capable of detecting timing variations that might produce write errors.

SUMMARY OF THE PREFERRED EMBODIMENTS

An aspect of the present invention provides an optical drive device, comprising an optical drive controller adapted to couple to and cause a laser diode driver to provide signals to drive a laser diode. The optical drive controller is capable of testing a channel between the optical drive controller and a laser diode driver. In response to testing such a channel, the optical drive controller generates a set of calibration signals to program a drive characteristic associated with a laser diode driver to accommodate a characteristic of a channel between the optical drive controller and a laser diode driver.

Another aspect of the present invention provides an optical drive device, comprising an optical drive controller and a laser diode driver providing drive signals to a laser diode. The laser diode driver is responsive to the optical drive controller and selectively provides read and write drive signals to the laser diode. A signal channel couples the optical drive controller to the laser diode driver. The optical drive controller outputs test signals over the signal channel. The laser diode driver receives the test signals from the signal channel, characterizes the signal channel and responsively generates a monitor signal. The laser diode driver provides the monitor signal to the optical controller.

BRIEF DESCRIPTION OF THE DRAWINGS

These and other aspects of the present invention will be better understood with reference to the accompanying drawings, which form a part of this disclosure.

FIGS. 3(a)-3(e) are timing diagrams for the laser diode driver of FIG. 2 illustrating certain problems that can arise due to variations in the timing signals.

FIGS. 4(a)-4(e) are additional timing diagrams for the laser diode driver of FIG. 2 illustrating certain problems that can arise due to variations in the duty cycle.

DETAILED DESCRIPTION OF THE PREFERRED EMBODIMENTS

Conventional optical disk drives do not monitor or test the write channels between the optical drive controller and the laser diode driver and so cannot identify imperfections such as jitter, skewing and variations in the write duty cycle in the write channel signals. Because these channels and their carried signals are not monitored or tested, the typical optical disk drive cannot tune the write channel signals to accommodate or correct for imperfections in the write channel signals. Such conventional optical disk drives consequently do not allow calibration of write channel signals to accommodate variations in the write channel signals or to accommodate differences in different write channels. Imperfections in the write channel signals may occur that can degrade the performance of an optical disk drive. Conventional optical disk drives cannot readily address this degradation.

According to a preferred aspect of the present invention, an implementation of an optical drive controller can test the write channels between the optical drive controller and the laser diode driver. Using the results of this testing, the optical drive controller preferably adjusts the characteristics of the write channel signals provided to the laser diode driver to correct for one or more expected imperfections in the signals provided to the laser diode driver.

According to a different preferred aspect of the present invention, both the optical drive controller and the laser diode driver have communications ports to facilitate communication between the two circuits. This allows the controller to set the laser diode driver in a calibration mode, which is used for testing the characteristics of the channels between the controller and the driver. The optical drive controller preferably can program operating characteristics associated with the laser diode driver so that the laser diode driver can be driven with signals from the optical drive controller that compensate for channel variations. This allows the controller and laser diode driver to accommodate variations in the write channels between the controller and the driver.

Having provided an overview, this specification now turns to a more detailed discussion of the problems that may arise in optical drive architectures.

Figure 1:
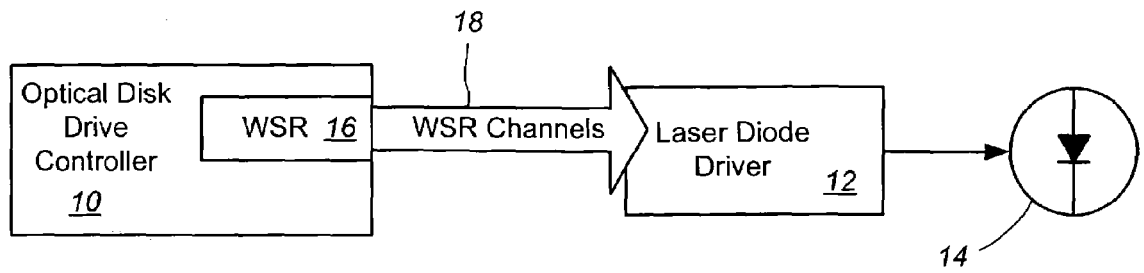
FIG. 1 illustrates a typical configuration of an optical disk drive (ODD) controller and a laser diode driver (LDD) used in an optical recording apparatus.

FIG. 1 illustrates an architecture of an optical recording apparatus including an optical drive controller such as an optical disk drive controller 10, a laser diode driver 12 controlled by the optical disk drive controller 10, and the laser diode 14 used to write data on optical recording media, such as an optical disk. The laser diode 14 is usually used for both writing and reading functions, but this is not required. For convenience and clarity, the present discussion is made in terms of an optical disk drive and in terms of a drive that uses a single laser diode to write to and read from an optical disk. The optical disk drive controller 10 provides the write strategy signals that contain the signal to be written and the timing information for data writing through the WSR circuits 16 within the optical disk drive controller 10. These write strategy signals are provided over the WSR channels 18 between the optical disk drive controller 10 and laser diode driver 12. As used here, the term WSR channels refers to the paths between the optical disk drive controller 10 and the laser diode driver 12 including the WSR receiving circuits within the laser diode driver 12.

Figure 2:
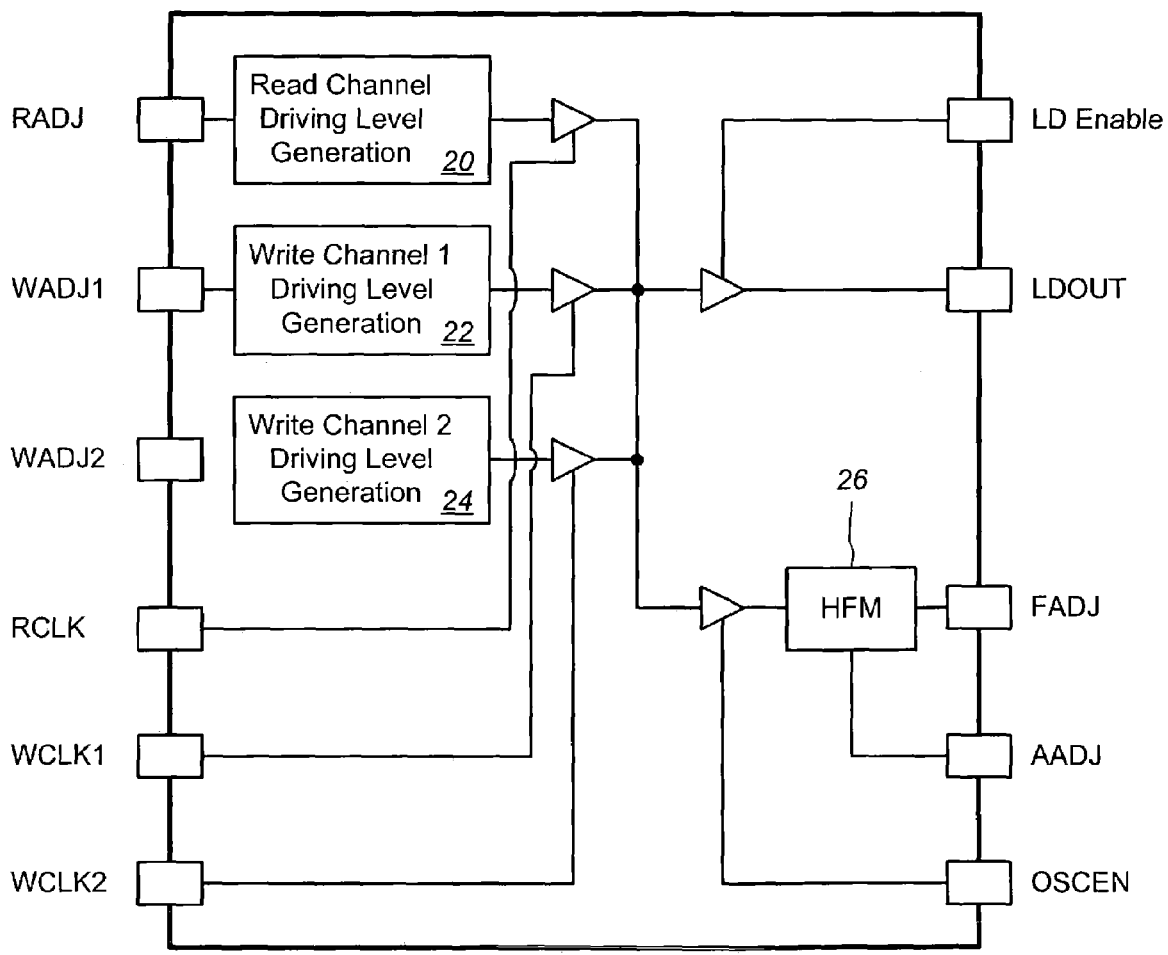
FIG. 2 illustrates in greater detail an exemplary architecture of a laser diode driver that might be used to drive a laser diode in an optical recording apparatus.

FIG. 2 illustrates an exemplary architecture of a laser diode driver 12 that might be used to drive a laser diode in an optical recording apparatus. Typically the laser diode is used both to write data to the disk and to read data from the disk, using different operating conditions adapted to each of these tasks. The laser diode driver 12 generally establishes these different operating conditions. There are three channels in the illustrated architecture of the FIG. 2 laser diode driver, one for reading and two for writing. The illustrated or laser diode driver may be an integrated circuit chip with the various signals provided through the pins or terminals labeled with those signals.

Signals RADJ, WADJ1 and WADJ2 are the signals used to adjust the driving level of the read channel, write channel 1 and write channel 2 in the FIG. 2 laser diode driver. Read channel driving level generation circuit 20 and write channel driving level generation circuits 22, 24 are respectively responsive to the RADJ, WADJ1 and WADJ2 signals to provide the desired outputs to the switching circuits. Signals RCLK, WCLK1 and WCLK2 are the signals used to control whether or not the driving levels of the read channel, write channel 1, and write channel 2 are to be summed to the laser diode driver output LDOUT that is provided to the laser diode 14 shown in FIG. 1. In the architecture illustrated in FIG. 2, the various clock signals are provided to buffers to clock the buffers to output the input signals, depending on the value of the clock signal. FADJ and AADJ are the signals used to adjust the frequency and the amplitude of the high frequency modulation (HFM) circuit 26.

FIGS. 3(a)-3(e) are timing diagrams conventional for the laser diode driver of FIG. 2, with the ideal timing diagrams shown in solid lines. If there is a delay or timing difference between the two write clocks, shown in dashed lines in FIG. 3(c), the resulting timing error can produce the overshoot imperfection in LDOUT indicated in FIG. 3(e). Such an overshoot can damage a laser diode and, to the extent the signal is safely converted to laser light, can damage the optical disk. The illustrated overshoot can reduce the lifetime of both the laser diode and the recordable optical disk. In addition, the delay difference in the writing clocks directly affects the timing accuracy of the recorded mark on the optical disk, which produces timing jitter and increases the bit error rate in the signals and data read back from the optical disk.

FIGS. 4(a)-4(e) are additional timing diagrams that might occur in a conventional implementation of the laser diode driver of FIG. 2. Again, the ideal signal is indicated by the solid lines and the imperfect signal is indicated by a dashed line. If the duty cycle of the WSR signal deviates from the ideal signal in the manner shown, the LDOUT signal also varies from its intended waveform. The jitter performance declines and the bit error rate rises. If, if as illustrated, the pulse width of the WSR signal is smaller than some critical value, the specific chemical reaction of the dye on the optical disk may not properly occur and data may not be written. In that case, although the laser diode may inject a pulse with the correct power onto the optical disk, because the total energy of the pulse is not enough to change the state of the dye on the disk, writing is not accomplished. Consequently a bit error results.

These sorts of imperfections in timing and waveforms may result from variations in the write channels and when they occur these imperfections may degrade the writing process and undermine the reliability of the written data. As discussed above, in the conventional optical disk drive architecture imperfections such as mismatching, skewing or others between different WSR channel paths cannot be monitored or tuned. Preferred implementations of the present invention, address aspects of these imperfections. Exemplary implementations may better optimize WSR channel paths so that greater control and potentially greater write speeds can be achieved for different implementations.

Figure 5:
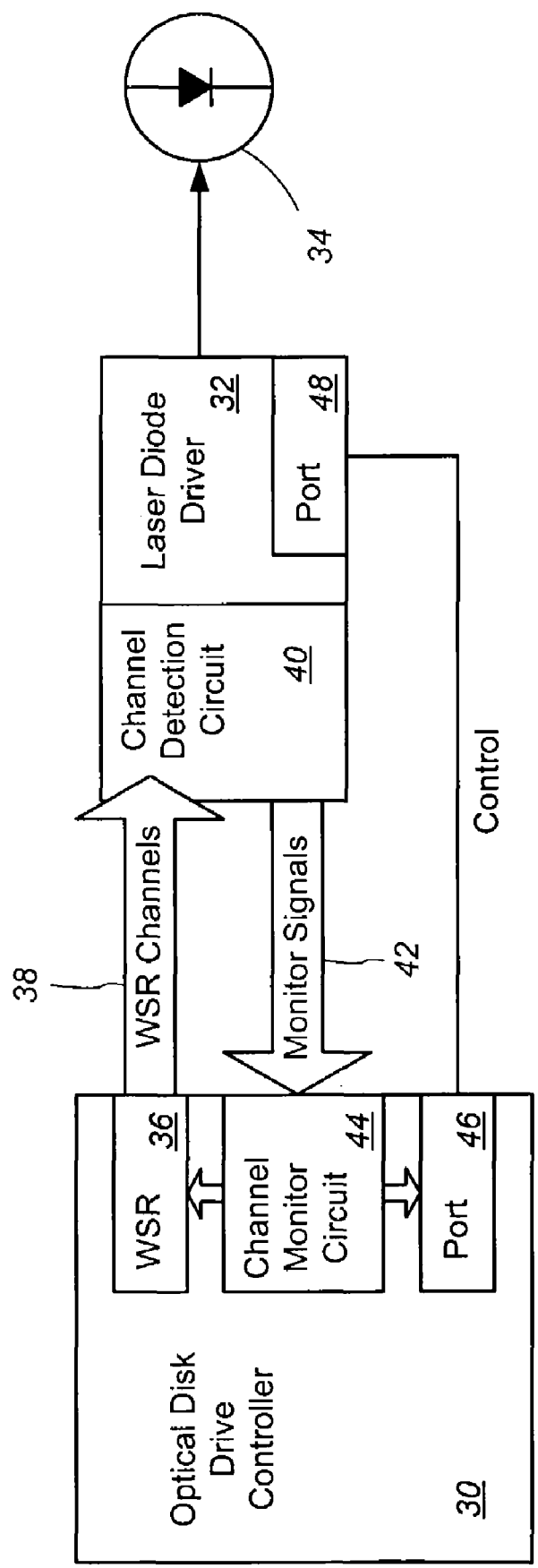
FIG. 5 schematically illustrates a preferred embodiment of an optical drive controller, laser diode driver and laser diode in accordance with a preferred implementation of aspects of the present invention.

FIG. 5 illustrates a preferred implementation of the present invention, including an optical drive controller 30 and laser diode driver 32 that provides driving signals to a laser diode 34 to write and read signals to and from an optical disk. This illustrated assembly is presently contemplated for an optical disk drive, but other optical memory architectures might advantageously use the teachings here. In normal operation, the WSR circuits 36 of the optical drive controller 30 provide WSR (write, read and clock) signals over the WSR channels 38 to the laser diode driver 32. The optical drive controller 30 can also generate test signals that are output over the WSR channels 38 in a process to characterize the WSR channels. The test signals are used for calibration. In some implementations the test signals could be the conventional WSR signals, but this is not necessary. For example, the test signals could be specifically generated and shaped to advantageously characterize the WSR channels.

The laser diode driver 32 includes a channel detection circuit 40 that receives and processes the test signals to characterize the WSR channels 38. The channel detection circuit 40 of the driver 32 receives the test signals and performs selected analog and digital signal processes on the received test signals to, for example, detect the phase, filter, integrate or otherwise characterize the test signals. The channel detection circuit 40 contains several sub-circuits (e.g., delay detection circuit, duty cycle detection circuit, etc.) that perform analog and/or digital operations to detect impairments introduced by the channels. The result of this analysis is a set of one or more monitor signals that characterize imperfections introduced by the WSR channels.

Channel monitor circuit 44 receives the monitor signals from the channel detection circuit 40 and generates one or more signals to calibrate the corresponding channel parameters. The channel monitor circuit 44 in the optical drive controller contains several sub-circuits such as a delay monitor circuit, a duty cycle detection circuit or others, to receive the monitor signals and generate the calibration signals to be provided to the WSR circuit.

Most preferably, the optical drive controller 30 issues a control signal through its communication port 48 that is received by a communication port 46 in the laser diode driver 32 to switch the laser diode driver 32 into a calibration mode. When the calibration process is completed or no longer desired, the optical drive controller 30 issues a control signal through the communication ports 48, 46 to return the laser diode driver 32 to a normal operation mode. Also, the optical drive controller 30 is preferably capable of programming the characteristics or parameters of the laser diode driver 32 through the communication ports 48, 46.

In general, the laser diode driver 32 preferably has the configuration of the driver 12 shown in FIG. 2 so that the laser diode driver chip 32 has the same number of pins or terminals with the same signals assigned to those pins or terminals. Most preferably the laser diode driver 32 multiplexes the signals on its pins according to the mode (calibration or normal) of the laser diode driver 32 selected by the optical drive controller 30. For example, the pin AADJ can be used as the pin to send the monitor signals during calibration and the pin OSCEN can be used as the pin to transmit and receive the control signals during calibration. Multiplexing is preferred as it allows the greater functionality of testing and programming to the laser diode driver without requiring additional pins.

Figure 6:
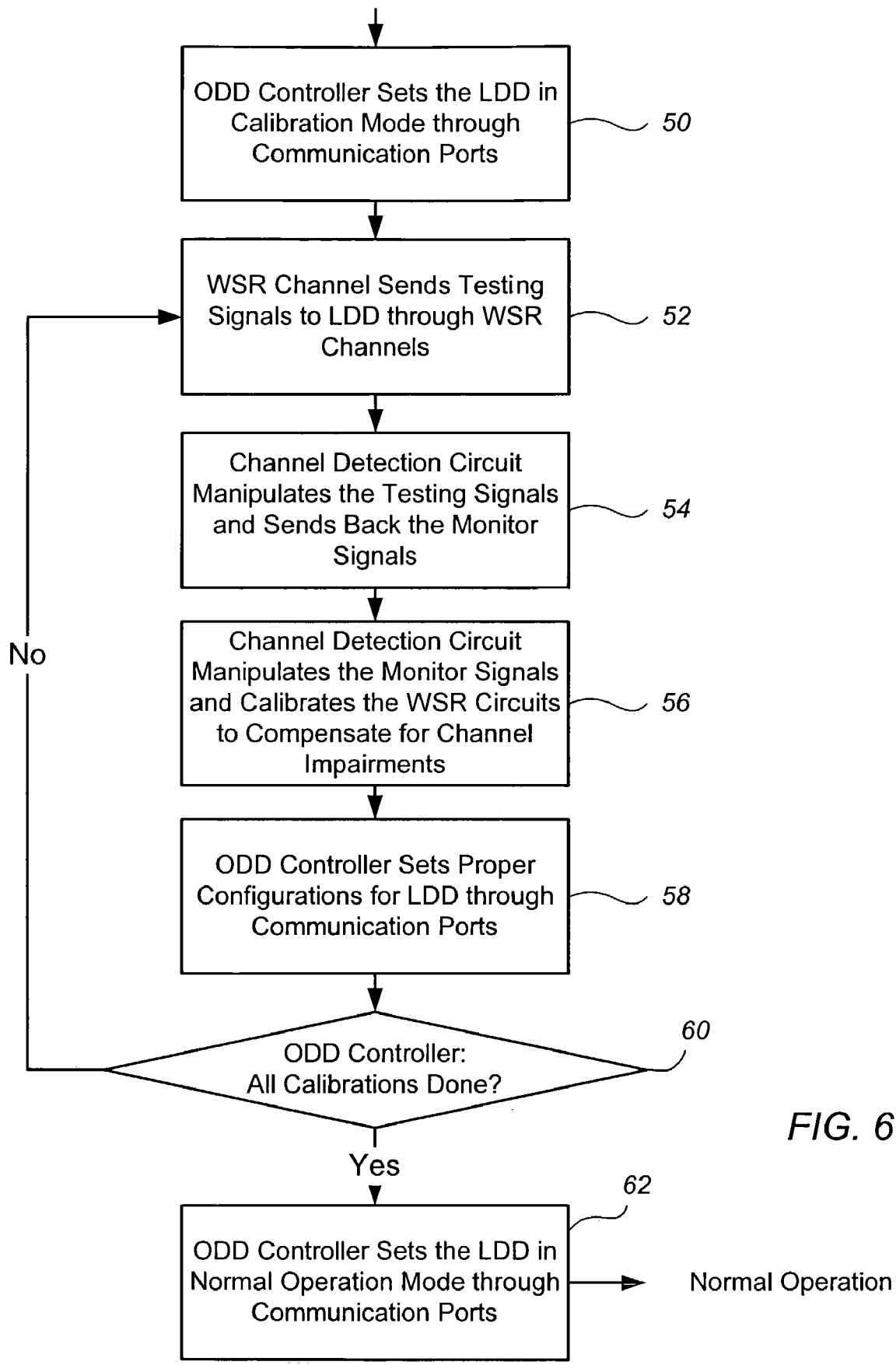
FIG. 6 illustrates a flow chart summarizing a calibration process that might be implemented with the FIG. 5 drive or another drive that implements aspects of the present invention.

FIG. 6 is a flow chart summarizing the calibration of a laser diode driver 32 by the optical drive controller 30. First the optical drive controller sets 50 the laser diode driver in calibration mode using a control signal. The WSR circuit in the optical drive controller sends 52 the test signals to the laser diode driver through the WSR channels. The channel detection circuit in the laser diode driver processes 54 the signals through phase detection, filtering, integrating or other processing and feeds back the processed signal to the channel monitor circuit in the optical drive controller. The channel monitor circuit receives the monitor signals and generates 56 the corresponding calibration signals and provides them to the WSR circuit to calibrate the WSR circuit to offset the impairments introduced to WSR signals by the WSR channels.

The optical drive controller then programs 58 more appropriate configurations for the laser diode driver through the communication ports according to the calibration results. The calibration process continues 60, in an essentially iterative process, until the channel monitor circuit indicates that the impairments into the WSR signals by different WSR channels are compensated. After all of the calibrations are finished, the optical drive controller sets 62 the laser diode driver in the normal operation mode again using the control signal through the communication ports. In this way the impairments between different WSR channel paths can be compensated and the best write performance can be obtained.

The circuitry described above is by way of example and is intended for the particular illustrated topology. In other implementations the laser diode driver need not be separate from the laser diode. On the other hand, in some embodiments the laser diode driver might be part of the same integrated circuit and more closely integrated with the optical disk drive controller. As such, the terms optical disk drive controller, optical drive controller laser diode driver, and WSR channel are intended to identify circuit elements and are not intended to suggest a limitation to a particular topology having particular divisions between structures or circuits. Similarly, whether a particular circuit such as a WSR circuit, channel detection circuit or channel monitor circuit is considered part of the optical drive controller or the laser diode driver should not alter the relevance of the present invention.

The present discussion has referenced optical disk recording. Different media are available and readily apparent to those of ordinary skill in the art and the present invention would be applicable to such other media, particularly if the laser diode driver is not closely linked to the optical drive controller for the optical recording process.

The present invention has been described with reference to certain preferred embodiments. Those of ordinary skill will appreciate that various modifications, extensions or alterations might be made to the described embodiments without varying from the basic teachings of the present invention. Thus, the present invention is not to be limited to any of its particular preferred embodiments and is instead defined by the claims, which follow.

What is claimed:

1. An optical drive device, comprising:
   an optical drive controller adapted to couple to a laser diode driver and to cause the laser diode driver to provide signals to drive a laser diode to output a modulated light signal corresponding to data to be written to an optical disk, the optical drive controller testing timing characteristics of an electrical channel between the optical drive controller and the laser diode driver and generating a set of calibration signals to program a laser diode drive characteristic associated with the laser diode driver in response to the testing of the electrical channel between the optical drive controller and the laser diode driver;
   wherein the electrical channel tested by the optical drive controller does not include an electrical path between the laser diode driver and the laser diode.

2. The optical drive device of claim 1, wherein the optical drive controller outputs one or more electrical test signals to the laser diode driver through the electrical channel between the laser diode driver and the optical drive controller, the optical drive controller receiving one or more electrical monitor signals generated by the laser diode driver in response to the one or more test signals, the one or more electrical monitor signals received through the electrical channel between the laser diode driver and the optical drive controller and characterizing the timing characteristics of the electrical channel, the optical drive controller generating one or more calibration signals responsive to one or more electrical monitor signals.

3. The optical drive device of claim 1, wherein the optical drive controller generates a first control signal to set the laser diode driver in a calibration mode for a calibration process and generates a second control signal to set the laser diode driver in a normal operation mode.

4. The optical drive device of claim 1, wherein the calibration signals adjust circuits within the optical drive controller.

5. The optical drive device of claim 1, wherein the calibration signals adjust circuits within the laser diode driver.

6. The optical drive device, of claim 1, wherein the optical drive controller outputs a test signal to the laser diode driver, the optical drive controller receiving a monitor signal generated in response to the test signal, the optical drive controller outputting a second test signal, responsive to the monitor signal, for calibrating the laser diode driver in an iterative process.

7. The optical drive device of claim 6, wherein the optical drive controller generates a first control signal to set the laser diode driver in a calibration mode for a calibration process and generates a second control signal to set the laser diode driver in a normal operation mode following the iterative process.

8. An optical drive device, comprising:
   an optical drive controller;
   a laser diode driver providing drive signals to a laser diode, the laser diode driver responsive to the optical drive controller to selectively provide read drive signals or write drive signals to the laser diode, the write drive signals causing the laser diode to output a modulated light signal corresponding to data to be written to an optical disk; and
   an electrical channel coupling the optical drive controller to the laser diode driver, the electrical channel communicating read signals or write signals between the optical drive controller and the laser diode driver, the optical drive controller testing timing characteristics of the electrical channel by outputting timing test signals over the electrical channel, the laser diode driver receiving the timing test signals from the electrical channel and operating on the timing test signals from the electrical channel to responsively generate a monitor signal, the laser diode driver providing the monitor signal to the optical drive controller;
   wherein the electrical channel tested by the optical drive controller does not include an electrical path between the laser diode driver and the laser diode.

9. The optical drive device of claim 8, wherein the optical drive controller generates a calibration signal in response to the monitor signal and, responsive to the calibration signal, programs a drive characteristic of the laser diode driver to accommodate a timing characteristic of the electrical channel between the optical drive controller and the laser diode driver determined by testing.

10. The optical drive device of claim 9, wherein the electrical channel couples through a flexible cable and wherein the laser diode driver and the laser diode are mounted on an optical head of the optical drive device.

11. The optical drive device of claim 9, wherein the optical drive controller outputs a first control signal to set the laser diode driver in a calibration mode for a calibration process and generates a second control signal to set the laser diode driver in a normal operation mode.

12. The optical drive device of claim 8, wherein the optical drive controller generates a calibration signal in response to the monitor signal and, responsive to the calibration signal, programs a drive characteristic within the optical drive controller to accommodate a characteristic of the electrical channel between the optical drive controller and the laser diode driver determined by testing.

13. The optical drive device of claim 8, further comprising a communication port configured in the laser diode driver to receive a control signal from the optical drive controller.

* * * * *